United States Patent [19]
Fisher et al.

[11] Patent Number: 5,793,131
[45] Date of Patent: Aug. 11, 1998

[54] SYSTEMS AND APPARATUS FOR CONTROLLING ENERGIZATION OF ELECTRIC MOTOR WINDINGS, AND METHODS OF ASSEMBLING MOTORS

[75] Inventors: Lynn Edwin Fisher, Fort Wayne; Jeannette Ann McLean, Garrett; James Victor Yu, Fort Wayne, all of Ind.

[73] Assignee: General Electric Company, Fort Wayne, Ind.

[21] Appl. No.: 692,953

[22] Filed: Aug. 7, 1996

[51] Int. Cl.[6] .................................................. H02K 11/00
[52] U.S. Cl. .................. 310/68 A; 310/68 R; 310/68 B; 310/68 E; 310/66; 200/81 R; 200/82 R
[58] Field of Search .......................... 310/68 A, 71, 310/66, 68 R, 68 B, 68 E; 200/81 R, 82 R

[56] References Cited

U.S. PATENT DOCUMENTS

| | | | |
|---|---|---|---|
| 3,989,486 | 11/1976 | Baysinger | 55/105 |
| 4,034,173 | 7/1977 | Crow et al. | 200/80 R |
| 4,091,249 | 5/1978 | Huffman | 200/83 |
| 4,382,433 | 5/1983 | Hess et al. | 126/113 |
| 4,482,847 | 11/1984 | Rudich, Jr. et al. | 318/9 |
| 4,517,481 | 5/1985 | Breining | 310/71 |
| 4,647,738 | 3/1987 | Diamond | 200/81 |
| 4,668,847 | 5/1987 | Greene | 200/153 |
| 4,716,326 | 12/1987 | Fisher | 310/89 |
| 4,791,329 | 12/1988 | Ubukata et al. | 310/68 |
| 4,808,865 | 2/1989 | King | 310/71 |
| 4,823,413 | 4/1989 | Chalberg et al. | 4/544 |
| 4,851,724 | 7/1989 | Polk et al. | 310/68 A |
| 4,947,068 | 8/1990 | Howard et al. | 310/71 |
| 5,543,671 | 8/1996 | Williams | 310/71 |

*Primary Examiner*—Steven L. Stephan
*Assistant Examiner*—Elvin G. Enad
*Attorney, Agent, or Firm*—Enrique J. Mora

[57] ABSTRACT

Systems and apparatus for integrating an air switch and a power cord into an electric motor, and methods for assembling an electric motor including an integral air switch and an integral power cord, are described. In one embodiment, an air switch and a power cord are incorporated into an electric motor. No additional removable cover is required for the switch and cord. To eliminate the motor centrifugal switch, an air switch is provided to control energization and de-energization of the motor windings. The air switch includes a snap action switch to cut-out the start winding used for ensuring that the rotor has sufficient starting torque.

19 Claims, 4 Drawing Sheets

SYSTEMS AND APPARATUS FOR CONTROLLING ENERGIZATION OF ELECTRIC MOTOR WINDINGS, AND METHODS OF ASSEMBLING MOTORS

FIELD OF THE INVENTION

This invention relates generally to electric motors and, more particularly, to controlling energization of electric motor windings for jetted bath tub and other user attended applications.

BACKGROUND OF THE INVENTION

Known jetted bath tubs include a pump having a pump motor. The pump motor typically is an electric AC motor having start and run windings. Energization of the motor windings is controlled, at least in part, by an operator actuated control switch and a centrifugal switch. The operator actuated control switch for jetted bath tub applications typically is an air switch. The centrifugal switch controls cut-out of the motor start winding based on rotor speed during motor start-up.

One known air switch used in jetted tub applications is a "push to start, push to stop" type air switch. The known air switch includes a normally open snap action switch and a spring-biased actuator. The snap action switch is electrically connected in series with a power line and the common connection of the pump motor start and run windings. The snap action switch includes a movable, spring-biased button which extends from the snap action switch housing. The button is normally biased to be in a fully extended condition, and when the button is fully extended, the snap action switch is in an open state. When the button is fully depressed inward towards the housing, the snap action switch is in a closed state.

The spring-biased actuator includes an actuating arm movable from and between first and second positions. In the first position, the actuating arm does not contact the snap action switch button. In the second position, the actuating arm is in contact with, and fully depresses, the snap action switch button. The actuator is biased so that the actuator arm is normally in the first position.

The air switch also includes an operator controlled air transmitter coupled to an air bellows. The transmitter includes a user depressible flexible diaphragm. When an operator presses against, and deforms, the flexible diaphragm, a pulse of air is delivered to the air bellows and causes the bellows to expand. The bellows acts against the actuator, and when the bellows expands, the position of the actuator changes. The air transmitter typically is located near or integral with the tub so that an operator in or next to the tub can depress the switch to initiate or stop pump operation.

More specifically, to initiate pump operation with the above described air switch, the operator depresses the air transmitter flexible diaphragm and a pulse of air from the air transmitter causes the air bellows to expand. The bellows acts against the actuator and causes the actuator to move from the first position to the second position. The actuator is latched into the second position and, as described above, depresses the button of the snap action switch. When the snap action switch button is depressed, the snap action switch closes and energy is delivered to the motor start and run windings through the power line.

Once the pump motor rotor reaches a predetermined speed during motor start-up, the centrifugal switch opens and the start winding is de-energized. The motor then operates with only the run winding energized.

To stop pump operation, the user again depresses the air transmitter flexible diaphragm and a pulse of air from the air transmitter again causes the air bellows to expand. The bellows acts against the actuator and causes the actuator to "unlatch" and move from the second position to the first position. As described above, the button of the snap action switch is not depressed when the actuator is in the first position. When the snap action switch button is not depressed, the snap action switch opens and the pump motor windings are de-energized.

The above described jetted bath tub pump motor application is referred to as a "user attended" application since the user has direct control over motor energization. There are many other "user attended" applications in addition to the jetted bath tub pump motor application.

Although the above described motor has proven reliable and satisfactory, it would be desirable to reduce the cost of such motor, in terms of both component cost and assembly cost. Particularly, eliminating the centrifugal switch would result in significant cost savings since the centrifugal switch is expensive. The centrifugal switch, however, controls energization of the start winding and such control is necessary for efficient motor operation during both motor start-up and run operations.

With respect to manufacture and assembly of the above described jetted tub motor, since the motor type for a jetted bath tub pump application generally is also utilized in other applications, the motor is manufactured and mostly assembled in a common assembly line with many other motors used for other applications. At a late point in assembly, motors for the jetted tub pump application are separated from the other motors on the line, and the air switch and power cord are added to the separated motors for the jetted tub pump application.

Since the air switch and power cord are added late in the assembly process, the air switch and the power cord typically are not mounted within the motor housing. Rather, the air switch and a portion of the power cord are housed within a removable cover which is removably secured to the motor endshield. The removable cover for the air switch and power cord, in one known form, is a molded thermoplastic housing.

Cost savings could potentially be realized by eliminating the above described removable cover. Due to the late point assembly of the air switch and power cord to the motor, however, the removable cover is required to protect these components and connections.

Accordingly, it would be desirable and advantageous to provide a low cost motor for jetted tub and other user attended applications. It would also be desirable and advantageous to provide such a low cost motor which is as reliable and safe as existing motors for user attended applications.

An object of the present invention is to provide a low cost motor for user attended applications, including for jetted tub pumps, by at least eliminating the centrifugal switch for controlling energization of the motor start winding.

Another object of the present invention is to eliminate the motor centrifugal switch without adversely affecting motor operation.

Still another object of the invention is to eliminate the removable cover for the air switch and associated power cord portion.

SUMMARY OF THE INVENTION

These and other objects may now be attained with systems and apparatus for integrating an air switch and a power cord into an electric motor, and methods for assembling an electric motor including an integral air switch and an integral power cord. More specifically, and in one embodiment, an air switch is mounted to, and substantially within, a motor housing formed by a motor shell and motor endshields. The motor shell has an opening therein. The air switch, in one embodiment, includes a boss and a housing. The air switch is positioned within the motor shell so that the air switch housing is located within the motor housing and the air switch boss extends through the motor shell opening. The air switch boss is threaded, and a nut is threadedly engaged to the boss and tightened against end shield.

The motor described above provides at least one important advantage in that the air switch housing is secured within the motor housing and no additional, removable cover is required. Elimination of the removable cover facilitates reducing the motor material and assembly costs.

In another embodiment, the motor also incorporates a power cord having power leads, an insulator, and a three pronged power plug. The power leads are positioned within the insulator along the entire length of the insulator, and the leads extend from one end of the insulator. A grommet having an opening through which the insulator extends is located near the one end of the insulator and forms a tight fit with the insulator. The grommet also has a groove in its outer periphery. The motor shell has a notch at one end thereof, and a portion of the motor shell wall at a periphery of the notch is located in the grommet groove. The motor also includes an endshield secured to the motor shell so that the endshield and the motor shell cooperate to hold, or trap, the grommet in the notch. The portions of the leads that extend from the one end of the insulator are connected to respective terminals located within the motor housing.

By securing the power cord to the motor as described above, no additional removable cover is required. Although the removable cover is eliminated, the air switch and the power cord still can be conveniently added at a late point in assembly. As explained above, eliminating the removable cover facilitates reducing the motor material and assembly costs.

To eliminate the motor centrifugal switch, and in accordance with yet another embodiment, an air switch is provided to control energization and de-energization of the motor windings, including de-energization of the start winding during motor start-up. In one embodiment, the air switch includes an actuator, a first snap action switch and a second snap action switch. The first and second snap action switches each include a movable, spring-biased button normally biased to be in a fully extended condition. When the first switch button is fully extended, the first switch is in an open, non-conducting state. When the first switch button is fully depressed, the first switch is in a closed, conducting state. Similarly, when the second switch button is fully extended, the second switch is in an open, non-conducting state. When the second switch button is fully depressed, the second switch is in a closed, conducting state.

The first and second snap action switches also each include a first blade terminal and a second blade terminal. The first blade terminal of the first snap action switch is electrically coupled to a first motor power terminal, and the second blade terminal of the first snap action switch is electrically coupled to the common connection between the motor run and start windings. The first blade terminal of the second snap action switch is electrically coupled to the start winding, and the second blade terminal of the second snap action switch is electrically coupled to a second motor power terminal.

The actuator includes a main body portion and an actuating arm extending from the main body portion. The actuating arm includes first and second actuating surfaces. The first and second actuating surfaces each include a transition, angular portion and a substantially planar portion. The second actuating surface also includes a delay surface. The actuator is positioned so that the actuating arm can extend between the first and second switches, and the actuator is spring biased so that the first and second actuating surfaces are normally biased to be out of contact with the first and second buttons. When the actuator arm sufficiently extends between the switches, the first and second actuating surfaces contact the buttons of the first and second switches, respectively.

The actuator further includes a channel for interfacing with a finger spring. As described hereinafter in more detail, one end of the finger spring is positioned within the channel, and the channel is movable relative to the finger spring. The finger spring limits movement of the actuator.

The channel includes a motor start leg, a motor run transition leg, a motor run position, a motor off transition leg, a motor off leg, and a motor off position. When the actuator is positioned so that the one end of the finger spring is located in the channel off position, the first and second actuating surfaces do not depress the first and second switch buttons. Therefore, the buttons are fully extended and the first and second switches are in the first, non-conducting condition.

When the actuator is forced forward toward the first and second snap action switches, e.g., by a first pulse of air, the one end of the finger spring is located in the motor start leg, and as the actuator moves forward with the one end of the finger spring in the motor start leg, the first actuating surface depresses the first switch button. Therefore, the first switch transitions from the first, non-conducting condition to the second, conducting condition. Similarly, the transition portion of the second actuating surface contacts the second button, and as the actuator continues to move forward with the one end of the finger spring in the motor start leg, the second button is depressed by the second actuating surface. Therefore, the second switch transitions from the first, non-conducting condition to the second, conducting condition. When both the first switch button and the second switch button are depressed, the start and run windings are energized.

Once the first air pulse no longer acts on the actuator, and due to the spring biasing of the actuator, the actuator moves so that the one end of the finger spring is located in the run transition leg and the actuator continues to move until the one end of the finger spring is located at the run position. When the one end of the finger spring is in the run position, the first button remains depressed by the first actuating surface and the run winding remains energized. The second button, however, is over the delay surface of the second actuating surface and is fully extended. Therefore, the second switch is in the second, non-conducting condition, and the start winding is de-energized. The actuator remains in this position during motor run operations.

Upon application of a second pulse of air, the actuator moves so that the one end of the finger spring is located in the motor off transition leg. When the second pulse of air no longer acts on the actuator, and due to the spring biasing of the actuator, the actuator moves so that the one end of finger spring is located in the motor off leg. The actuator continues to move until the one end of the actuator is located at the motor off position.

When the finger spring is located in the motor off transition leg, the first actuating surface continues to depress the first button, and the second actuating surface does not depress the second button. When the one end of the finger spring is located in the motor off leg, and as the actuator moves so that the one end of the finger spring is located closer to the motor off position, the first button transitions from being fully depressed to not being depressed. Therefore, the first switch transitions from the first, conducting condition to the second, non-conducting condition, and the run winding is de-energized. When the one end of the finger spring is located at the motor off position, the first and second switches are in the second, non-conducting conditions and the motor windings are not energized.

The air switch described above can now be used to replace the known air switch and motor centrifugal switch combination. Therefore, by using the above described air switch, the centrifugal switch can now be eliminated. As a result, the motor cost can be further reduced.

DETAILED DESCRIPTION

Figures 1, 2, 3:
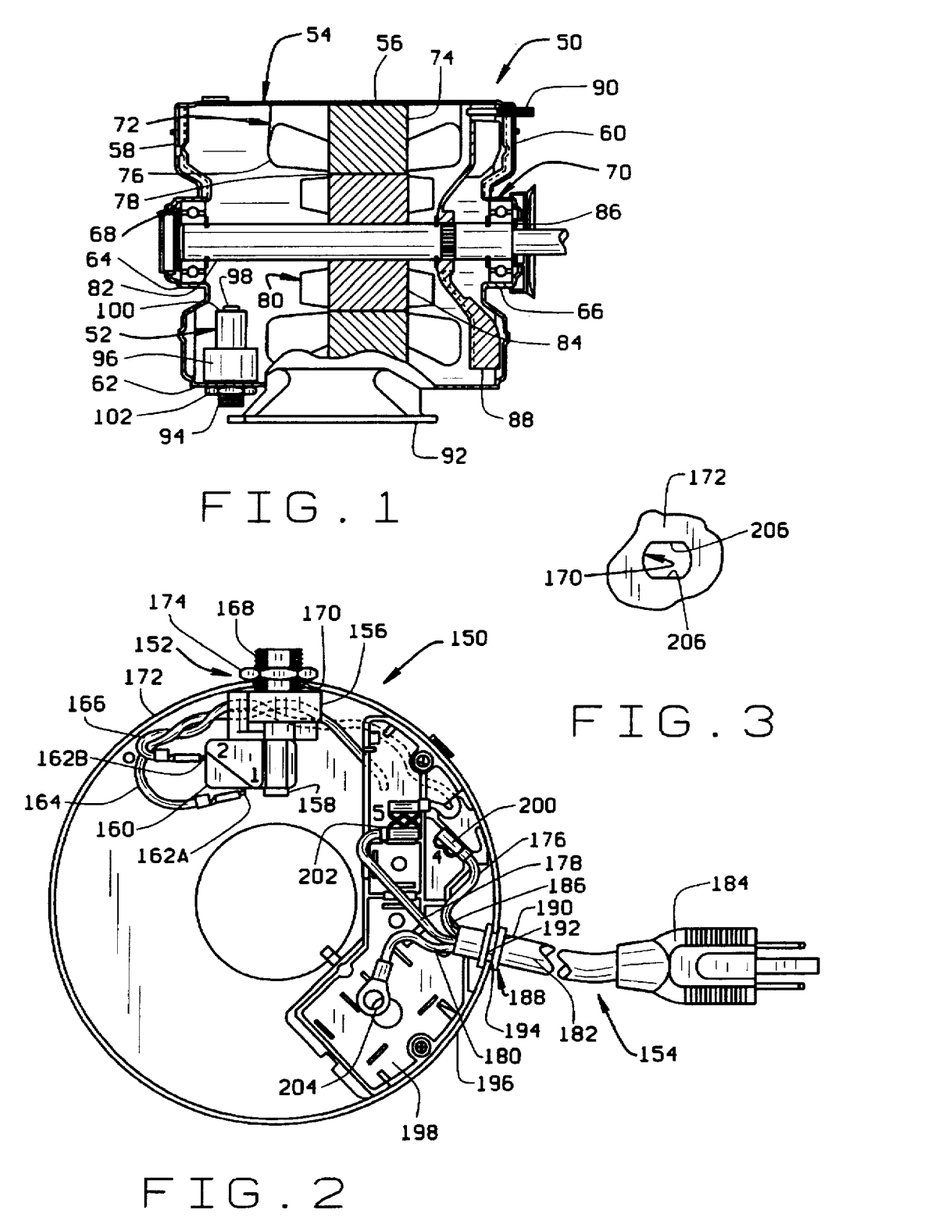
FIG. 1 shows a partial cross section view, with parts cut-away, of an electric motor incorporating an air switch in accordance with one embodiment of the present invention.
FIG. 2 is an end view, with parts cut-away, of an electric motor incorporating an air switch and a power cord in accordance with another embodiment of the present invention.
FIG. 3 is a top view of a repunch opening in the motor shell for the air switch shown in FIG. 2.

FIG. 1 shows a partial cross section view, with parts cut-away, of an electric motor 50 incorporating an air switch 52 in accordance with one embodiment of the present invention. Motor 50 includes a housing 54 formed by a motor shell 56 and motor endshields 58 and 60. Motor shell 56 has an opening 62 therein. Motor endshields 58 and 60 include supports 64 and 66 for bearing assemblies 68 and 70, respectively. A stator 72 including a stator core 74 having start and run windings 76 is mounted within motor shell 56. Stator core 74 forms a stator bore 78. A rotor 80 having a rotor shaft 82 is concentrically arranged with respect to stator core 74. Rotor 80 also includes a rotor core 84 positioned concentrically with, and attached to, rotor shaft 82. Rotor shaft 82 is coaxially aligned with bearing assemblies 68 and 70 and extends through an opening 86 in endshield 60. A fan 88 is secured to, and rotates with, rotor shaft 82. Endshields 58 and 60 are secured to shell 56 by threaded bolts 90 which are inserted through aligned openings in endshields 58 and 60 and stator core 74. Motor 50 also includes a base 92 for support and mounting.

Air switch 52 includes a boss 94 and a housing 96. Electric contacts 98 (only one contact 98 is visible in FIG. 1) are located at one end 100 of housing 96, and one contact 98 is coupled to a power line (not shown) and one contact 98 is coupled to a common connection of motor start and run windings 76. Air switch housing 96 is positioned within motor shell 56, and air switch boss 94 extends from air switch housing 96 through motor shell opening 62. Air switch boss 94 is threaded, and a nut 102 is threadedly engaged to boss 94 and tightened against shell 56.

In the embodiment shown in FIG. 1, air switch 52 is preferably a "push to start, push to stop" type switch, which type is well known in the art. More specifically, air switch 52 includes a normally open snap action switch (not shown) and a spring-biased actuator (not shown) positioned within housing 96. The snap action switch is electrically connected in series with the motor power line and the common connection of motor start and run windings 76 via contacts 98. The snap action switch includes a movable button biased by a spring or other suitable biasing element (not shown) which extends from the snap action switch housing. The button is normally biased to be in a fully extended condition, and when the button is fully extended, the snap action switch is in an open state. When the button is fully depressed inward towards the snap action switch housing, the snap action switch is in a closed state.

The spring-biased actuator includes an actuating arm movable from and between first and second positions. In the first position, the actuating arm does not contact the snap action switch button. In the second position, the actuating arm is in contact with, and fully depresses, the snap action switch button. The actuator is biased so that the actuator arm is normally in the first position.

Air switch 52 also includes an operator controlled air transmitter (not shown) in flow communication with an air bellows located within housing 96. Specifically, one end of a tube (not shown) is engaged to boss 94 and the other end of the tube is engaged to the output of the air transmitter. As will be readily understood by one skilled in the art, the transmitter includes a user depressible flexible diaphragm, and when an operator presses against, and deforms, the flexible diaphragm, a pulse of air is communicated from the air transmitter, through the tube, and to the air bellows. The air bellows expands and acts against the actuator, which causes the actuator to move. In a jetted tub application, the air transmitter typically is located near or integral with the tub so that an operator in or next to the tub can depress the flexible diaphragm to initiate or stop pump operation.

Specifically, to initiate pump operation with air switch 52, the operator depresses the air transmitter flexible diaphragm and a pulse of air from the air transmitter causes the bellows to expand and move the actuator from the first position to the second position. The actuator is latched into the second position and, as described above, depresses the button of the snap action switch. When the snap action switch button is depressed, the snap action switch closes and energy is delivered to motor start and run windings 76 through the motor power line.

Once motor rotor 80 reaches a predetermined speed during motor start-up, a centrifugal switch (not shown) opens and the start winding is de-energized. Motor 50 then operates with only the run winding energized.

To stop pump operation, the user again depresses the air transmitter flexible diaphragm and a pulse of air from the air transmitter causes the bellows to expand and "unlatch" the actuator, which results in the actuator moving from the second position to the first position. When the actuator is in the first position, and as described above, the button of the snap action switch is not depressed. When the snap action switch button is no longer depressed, the snap action switch opens and the pump motor run winding is de-energized.

The above described jetted bath tub pump motor application is referred to as a "user attended" application since the user has direct control over motor energization. It will be appreciated that there are many other "user attended" applications in addition to the jetted bath tub pump motor application in which motor 50 can be used.

Motor 50 provides an important advantage over known designs in that air switch 52 is substantially secured within motor shell 56 and no additional removable cover is required. In the past, the air switch has been secured to the motor in a removable cover. Elimination of the removable cover facilitates reducing the motor material and assembly costs.

FIG. 2 shows an end view, with parts cut-away, of an electric motor 150 incorporating an air switch 152 and a power cord 154 in accordance with another embodiment of the present invention. Air switch 152 is a "push to start, push to stop" type switch and includes an air chamber 156, an actuator 158 biased by a spring or other suitable biasing element and partially positioned within chamber 156, and a normally open snap action switch 160. Snap action switch 160 includes a first blade terminal 162A and a second blade terminal 162B. First blade terminal 162A is electrically connected to a first conductor 164 and second blade terminal 162B is electrically connected to a second conductor 166. First conductor 164 is coupled to a power line and second conductor 166 is coupled to a common electrical connection between start and run windings (not shown) of motor 150.

Snap action switch 160 also includes a movable button biased by a spring or other suitable biasing element (not shown). The button is normally biased to be in a fully extended condition. When the button is fully extended, snap action switch 160 is in an open, non-conducting state, and when the button is fully depressed, snap action switch 160 is in a closed, conducting state.

Actuator 158 includes an actuating arm (not shown) movable from and between first and second positions. When the actuator arm is in the first position, the actuating arm does not contact the snap action switch button. When the actuating arm is in the second position, the actuating arm is in contact with, and depresses, the snap action switch button. Actuator 158 is biased so that the actuator arm is normally in the first position.

Air switch 152 also includes a boss 168 which extends through an opening 170 in motor shell 172, and a nut 174 is threadedly engaged to boss 168. An operator controlled air transmitter (not shown) is in flow communication with air switch actuator. A flexible tube (not shown), for example, extends from and between an output of the air transmitter and boss 168. The air transmitter utilized with air switch 152 may be identical to the air transmitter described above in connection with FIG. 1.

Power cord 154 has power leads 176, 178 and 180, an insulator 182, and a three pronged power plug 184. Power leads 176, 178 and 180 are positioned within insulator 182 along the entire length of insulator 182, and extend from one end 186 of insulator 182. A grommet 188, having an opening 190 through which insulator 182 extends, has a groove 192 therein. Motor shell 172 has a notch 194 at one end 196 thereof, and a portion of a wall of motor shell 172 at a periphery of notch 194 is located in grommet groove 192. Motor 150 also includes an endshield (not shown in FIG. 2) secured to motor shell 172 at end 196 so that the endshield and motor shell 176 cooperate to hold grommet 188 in notch 194.

A circuit, or switch, board 198 is mounted within motor shell 176, and circuit board 198 includes terminal connectors 200 and 202. Power leads 176 and 178 are connected to respective connectors 200 and 202. A ring terminal 204 is connected at an end of power lead 180. Ring terminal 204 is connected, for example, to the motor ground terminal (not shown).

To assemble air switch 152 and power cord 154 into motor shell 172, air switch 152 is positioned within motor shell 172, and air switch boss 168 is inserted through motor shell opening 170 so that boss 168 extends from motor shell 172. Nut 174 is then threadedly engaged to boss 168 and tightened against shell 172. Conductors 164 and 166 are then connected to respective blade terminals 162A and 162B. In addition, and before, after or while assembling air switch 152 into shell 172, power cord 154 is positioned so that power leads 176, 178 and 180 are located within motor shell 172 and are connected to respective terminals. Grommet 188 is inserted into motor shell notch 194, and the motor endshield is then secured to motor shell 172 so that grommet 188 is securely held, or trapped, in notch 194.

FIG. 3 is a top view of opening 170 in motor shell 172 through which air switch boss 168 extends as shown in FIG. 2. Since air switch 152 is assembled into motor shell 172 at a late point in the assembly process as described above, motor shell 172 can be initially punched, using dies, to form indentations at a periphery of opening 170. Once the motor set to receive an air switch have been separated from, or at least selected from, other motors on the assembly line, each motor shell 172 of each motor 150 to include air switch 152 can be further punched at the location of the initial punch so that opening 170 is formed. Opening 170 includes anti-rotation flat portions 206 to facilitate preventing boss 168 (FIG. 2) from rotating relative to shell 172.

Motor 150 described above provides an important advantage in that both air switch 152 and power cord 154 are secured within, and to, motor shell 172 and no additional removable cover is required. The removable cover is eliminated and yet air switch 152 and power cord 154 still can be added at a late point in assembly. Elimination of the removable cover facilitates reducing the motor material and assembly costs.

Motors 50 and 150 described above include a centrifugal switch for controlling energization, or cut-out, of the motor start winding. As is well known, such control is necessary for efficient motor operation during both motor start-up and run operations. Eliminating the centrifugal switch, however, would result in further cost savings since the centrifugal switch is relatively expensive.

Figure 4:
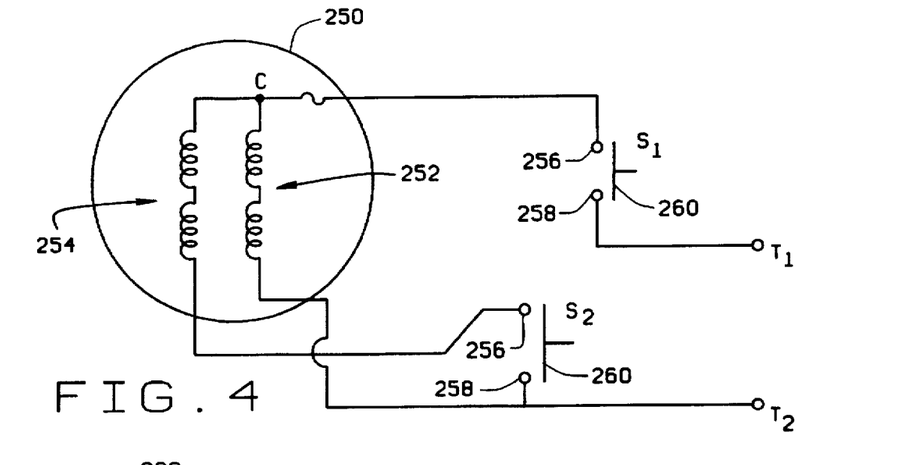
FIG. 4 is a circuit schematic diagram of an electric motor and switch controls in accordance with yet another embodiment of the present invention.

FIG. 4 is a circuit schematic diagram of an electric motor 250, a first switch $S_1$ and a second switch $S_2$ arranged, i.e., electrically connected, in a manner which advantageously enables elimination of the centrifugal switch. More specifically, motor 250 includes main, or run, winding 252 and start winding 254. Run and start windings 252 and 254 are connected at a common connection "C". First switch $S_1$ is connected in series between a first power terminal $T_1$ and common connection C. Second switch $S_2$ is connected in series between start winding 254 and a second power terminal $T_2$. First and second switches $S_1$ and $S_2$ each include first and second contacts 256 and 258, and a conducting bar 260.

First switch $S_1$ has a first, non-conducting condition in which its conducting bar 260 is not in circuit with its first and second contacts 256 and 258, as shown in FIG. 4. First switch $S_1$ also has a second, conducting condition in which its conducting bar 260 is in circuit with its first and second contacts 256 and 258. Second switch $S_2$ also has a first, non-conducting condition and a second conducting condition as described above with reference to first switch $S_1$.

In order to eliminate the centrifugal switch described above, during motor start up, first and second switches $S_1$ and $S_2$ are controlled or actuated to transition from the first, non-conducting condition to the second conducting condition. Therefore, both run and start windings 252 and 254 are energized.

Once the motor rotor has developed sufficient starting torque, second switch $S_2$ is controlled to transition from the second conducting condition to the first, non-conducting condition. Start winding 254 is then de-energized, or cut-out, and motor 250 operates with run winding energized 252.

To turn motor 250 off, first switch $S_1$ is transitioned from the second, conducting condition to the first, non-conducting condition. Therefore, run winding 252 also is de-energized. Importantly, run winding 252 is de-energized without having to energize start winding 254.

Figures 5, 6:
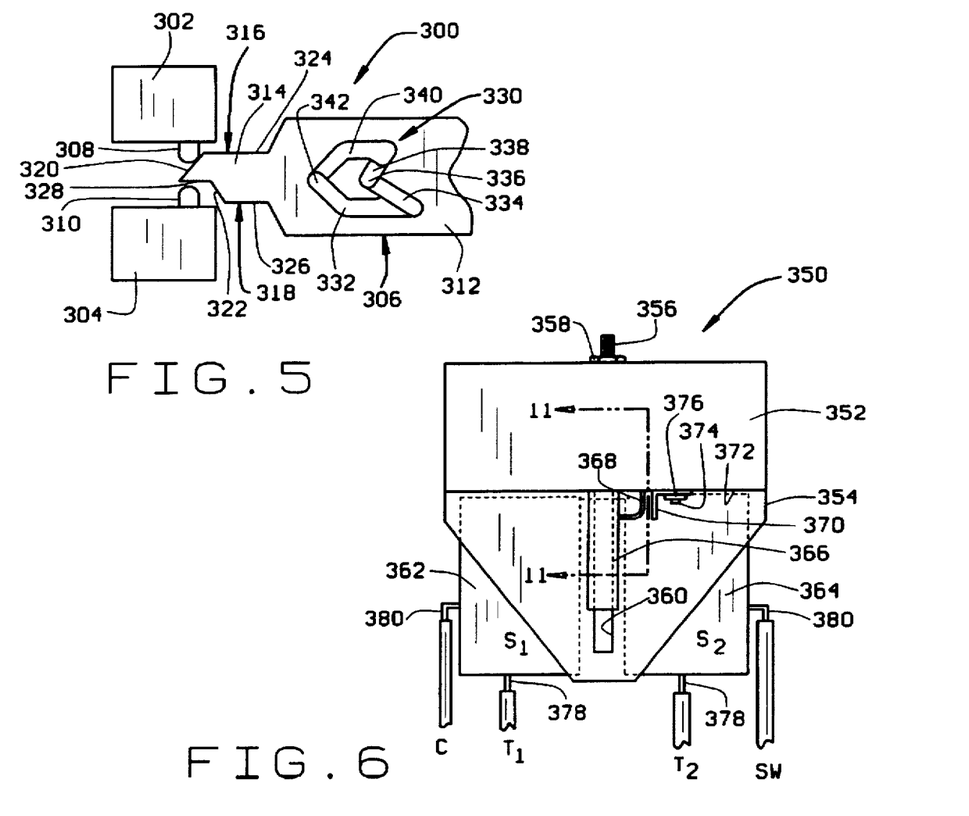
FIG. 5 illustrates one switching apparatus including snap action switches and an actuator in accordance with one embodiment of the present invention.
FIG. 6 is a top view illustrating another switching apparatus including snap action switches and an actuator in accordance with yet another embodiment of the present invention.

One exemplary switching apparatus 300 which provides the switching operation described above in connection with FIG. 4, is illustrated, with parts cut-away, in FIG. 5. More specifically, apparatus 300 includes a first snap action switch 302 and a second snap action switch 304. First switch 302 corresponds to first switch $S_1$ (FIG. 4), and second switch 304 corresponds to second switch $S_2$ (FIG. 4). Apparatus 300 also includes an actuator 306 movable relative to, and between, first and second snap action switches 302 and 304.

First and second snap action switches 302 and 304 include movable, mechanically-biased (e.g., spring-biased) buttons 308 and 310 normally biased to be in a fully extended condition. When first switch button 308 is fully extended, first switch 302 is in an open, non-conducting state. When first switch button 308 is fully depressed, first switch 302 is in a closed, conducting state. Similarly, when second switch button 310 is fully extended, second switch 304 is in an open, non-conducting state. When second switch button 310 is fully depressed, second switch 304 is in a closed, conducting state.

Actuator 306 includes a main body portion 312 and an actuating arm 314 extending from main body portion 312. Actuating arm 314 includes first and second actuating surfaces 316 and 318, respectively. First and second actuating surfaces 316 and 318 include transition, angular portions 320 and 322 and substantially planar portions 324 and 326. Second actuating surface 318 also includes a delay surface 328. Actuator 306 is biased so that first and second actuating surfaces 316 and 318 are biased out of contact with first and second buttons 308 and 310.

Actuator 306 further includes a channel 330 for interfacing with a finger spring (not shown in FIG. 5). As described hereinafter in more detail, one end of the finger spring is positioned within channel 330, and channel 330 is movable relative to the finger spring. The finger spring limits, or controls, movement of actuator 306.

Channel 330 includes a motor start leg 332, a motor run transition leg 334, a motor run position 336, a motor off transition leg 338, a motor off leg 340, and a motor off position 342. When one end of the finger spring is located at off position 342, first and second actuating surfaces 316 and 318 do not depress first and second buttons 308 and 310. Therefore, buttons 308 and 310 are fully extended, and first and second switches 302 and 304 are in the first, non-conducting condition.

When actuator 306 is forced forward, e.g., by a first pulse of air, the one end of the finger spring is located in motor start leg 332 and then, when the air pulse no longer acts on actuator 306 and due to the spring biasing of actuator 306, the one end of the finger spring travels in motor run transition leg 334 and actuator 306 comes to rest so that the one end of the finger spring is located at motor run position 336. When the one end of the finger spring is located in motor start leg 332, and as actuator 306 moves forward, first actuating surface 316 depresses first button 308. Therefore, first switch 302 transitions from the first, non-conducting condition to the second, conducting condition. Similarly, transition portion 322 of second actuating surface 318 contacts second switch button 310. As actuator 306 continues to move forward, second switch button 310 is depressed by actuating surface 318. Therefore, second switch 304 transitions from the first, non-conducting condition to the second, conducting condition.

Similar to the operation described above with respect to first switch 302, second switch 304 is operated in the following manner during transition to motor run. Particularly, once the first air pulse no longer acts on actuator 306, and due to the biasing of actuator 306, the one end of the finger spring travels in run transition leg 334 and actuator 306 comes to rest so that the one end of the finger spring is located at run position 336. When the one end of the finger spring is at run position 336, first switch button 308 is depressed by first actuating surface 316. Second switch button 310, however, is in contact with delay surface 328 of second actuating surface 318 and is not depressed. Therefore, second switch 304 is in the second, non-conducting condition.

Upon application of a second pulse of air, the one end of the finger spring travels in motor off transition leg 338. When the second pulse of air no longer acts on actuator 306, and due to the spring biasing of actuator 306, the one end of the finger spring travels in motor off leg 340, and actuator 306 comes to rest so that the one end of the finger spring is located at motor off position 342.

When the one end of the finger spring is located in motor off transition leg 338, first actuating surface 316 continues to depress first switch button 308. Also, second actuating surface 318 does not depress second switch button 310. When the one end of the finger spring is located in motor off leg 340, and as actuator 306 moves, first switch button 308 transitions from being fully depressed to not being depressed. Therefore, first switch 302 transitions from the first, conducting condition to the second, non-conducting condition.

Apparatus 300 described above conveniently satisfies the functional switching control requirements described in connection with the FIG. 4 circuit schematic. It will be appreciated that there are many alternative switching embodiments which can achieve these functional control requirements.

One such alternative embodiment is shown in FIG. 6. Specifically, FIG. 6 is a top view of a switching apparatus 350 which operates in accordance with the switching principles described above. Apparatus 350 includes an air chamber plate 352 and lower and upper mounting plates 354 (only upper plate 354 is visible in FIG. 6) secured to chamber plate 352. An expandable bellows (not shown in FIG. 6) is located below plate 352. By way of example, a threaded inlet port 356 can be secured to chamber plate 352 by a nut 358. One end of a flexible tube (not shown) extending from an air transmitter (not shown) can be attached to port 356. An actuator slot 360 is formed in upper mounting plate 354.

Switching apparatus 350 further includes a first snap action switch 362 and a second snap action switch 364. First and second snap action switches 362 and 364 each include a movable, spring-biased button normally biased to be in a fully extended condition.

Switching apparatus 350 also includes an actuator 366 having an actuator arm (not shown in FIG. 6) movable relative to first and second snap action switches 362 and 364. Actuator 366 has grooves therein (not shown in FIG. 6), and extends through slot 360 in plate 354. Walls of plate 354 are positioned in the actuator grooves to maintain actuator 366 in sliding engagement with plate 354. Actuator 366 is spring biased by a spring (not shown in FIG. 6). Actuator 366 also includes a channel (not shown in FIG. 6) identical to channel 330 shown in FIG. 5, and a finger spring 368 has one end positioned in the channel. A stop member 370, secured to a wall 372 of chamber 352 by a threaded boss 374 and nut 376, prevents finger spring 368 from moving out of the channel.

First and second snap action switches 362 and 364 each include a first blade terminal 378 and a second blade terminal 380. First blade terminal 378 of first snap action switch 362 is electrically coupled to a first motor power terminal $T_1$, and second blade terminal 380 of first snap action switch 362 is electrically coupled to common connection C between the motor run and start windings. First blade terminal 378 of second snap action switch 364 is electrically coupled to a second motor power terminal $T_2$, and second blade terminal 380 of second snap action switch 364 is electrically coupled to motor start winding SW. Switch 362 corresponds to switch $S_1$ (FIG. 4) and switch 364 corresponds to switch $S_2$ (FIG. 4).

As described with reference to FIG. 5, when the first switch button is fully extended, first switch 362 is in an open, non-conducting state, and when first switch button is fully depressed, first switch 362 is in a closed, conducting state. When the second switch button is fully extended, second switch 364 is in an open, non-conducting state, and when second switch button is fully depressed, second switch 364 is in a closed, conducting state.

Figure 7:
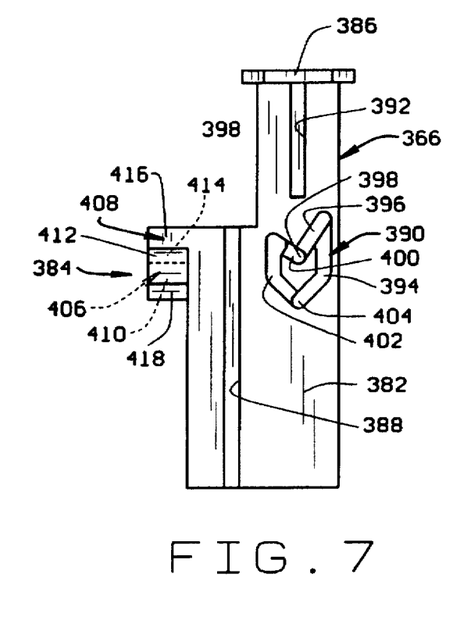
FIG. 7 is a front view of the actuator shown in the air switch illustrated in FIG. 6.

FIG. 7 is a front view of actuator 366. Actuator 366 includes a main body portion 382, an actuating arm 384 extending from main body portion 382, and an actuator head 386. Main body portion 382 includes first and second grooves 388 (only first groove 388 is visible in FIG. 7) and channel 390. Actuator 366 also includes an actuator travel limiting slot 392 that cooperates with a portion of finger spring 368, as described hereinafter in more detail, to limit the motion of actuator 366. Actuator head 386 is configured to be positioned against the air bellows, which also is described hereinafter in more detail.

Channel 390 includes a motor start leg 394, a motor run transition leg 396, a motor run position 398, a motor off transition leg 400, a motor off-leg 402, and a motor off position 404. Channel 390 is identical to channel 330 shown in FIG. 5 and performs the same function. Further details regarding channel 390 are set forth hereinafter.

Actuating arm 384 includes first and second actuating surfaces 406 and 408. First and second actuating surfaces 406 and 408 each include transition, angular portions 410 and 412 and substantially planar portions 414 and 416. Second actuating surface 408 also includes a delay portion 418.

Figure 8:
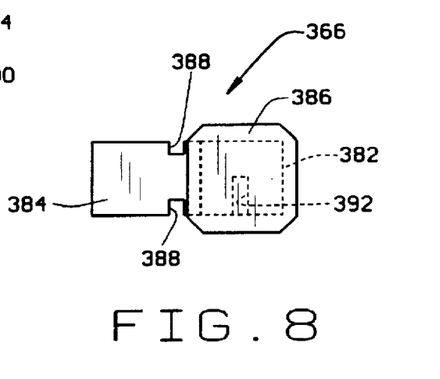
FIG. 8 is a top view the actuator shown in FIG. 7.

FIG. 8 is a top view of actuator 366 shown in FIG. 7. As shown in FIG. 8, actuator head 386 has a greater cross sectional area than other portions of actuator 366. Actuator head 386 is configured to be located in contact with the air bellows, and when the bellows expands, the bellows acts on actuator 366 with sufficient force to overcome the spring force exerted against actuator 366.

Figure 9:
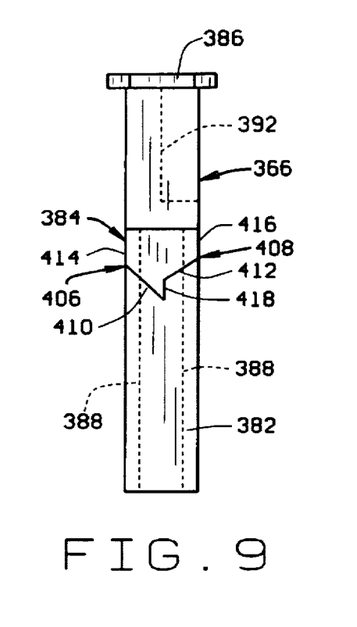
FIG. 9 is side view of the actuator shown in FIG. 7.

FIG. 9 is a side view of actuator 366 shown in FIG. 7. Grooves 388 are shown in phantom in FIG. 9. Also, first and second actuating surfaces 406 and 408 are clearly shown in FIG. 9. In one embodiment, transition portions 410 and 412 are at slopes of approximately about 44 to 46 degrees.

Figure 10:
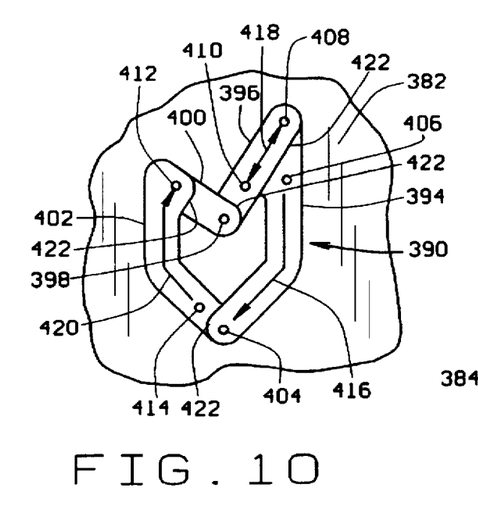
FIG. 10 is an enlarged front view of the actuator channel shown in FIG. 7.

FIG. 10 is an enlarged front view of channel 390. As described above, channel 390 includes motor start leg 394, motor run transition leg 396, motor run position 398, motor off transition leg 400, motor off leg 402, and motor off position 404. Also, reference points 406, 408, 410, 412 and 414 are indicated in FIG. 10 with reference lines 416, 418 and 420 having arrows indicating directions. A reference surface "A" is used to define the following relative slopes and elevations. By way of example, and not of limitation, in one embodiment, the slope from point 406 to point 404 is downward from 0.025 to 0.075 mils. Point 406 is 0.030 to 0.020 mils below surface A. The surface between points 408 and 410 is 0.045 to 0.035 mils below surface A. Point 398 is 0.060 to 0.050 mils below surface A. Point 412 is 0.089 to 0.079 mils below surface A. The slope from point 412 to point 414 in the direction indicated by line 420 is 0.055 to 0.084 mils. Point 414 is 0.080 to 0.070 mils below surface A. Steps 422 also are formed in channel. The above described relative elevations and slopes are believed to facilitate and ensure proper movement of channel 390 relative to finger spring 368.

Figure 11:
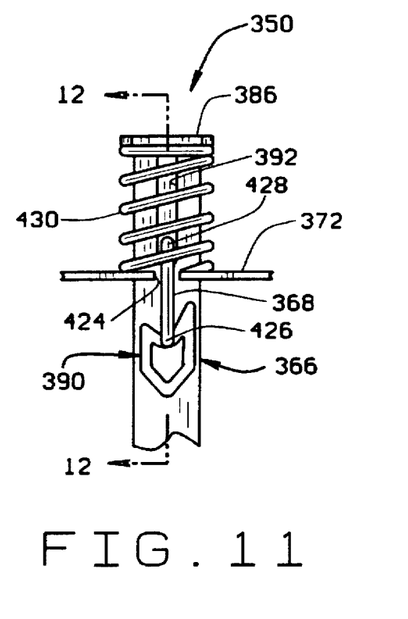
FIG. 11 is a view of the air switch, with parts cut-away, through line 11—11 in FIG. 6.

FIG. 11 is a view of air switch 350, with parts cut-away, through line 11—11 in FIG. 6. As shown in FIG. 11, wall 372 of plate 352 (FIG. 6) includes an opening 424. Finger spring 368 extends through opening 424, and one end 426 of spring 368 is located in channel 390 and one end 428 of spring 368 is located in a slot 392. A spring 430 is located around actuator 366 and extends from and between wall 372 and actuator head 386. Finger spring 368 is located between actuator 366 and spring 430 is maintained in a substantially fixed position due to the tight fit with spring 430. Spring 430 is biased to force head 386 away from wall 372.

Figure 12:
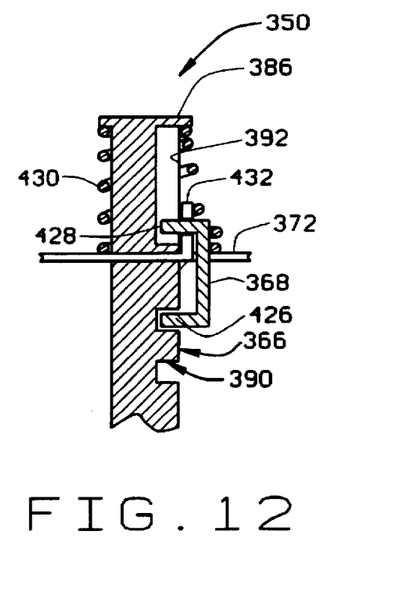
FIG. 12 is a view of the air switch, with parts cut-away, through line 12—12 in FIG. 11.

FIG. 12 is a view of air switch 350, with parts cut-away, through line 12—12 in FIG. 11. Referring to FIG. 12, the arrangement of finger spring 368, slot 392 and spring 430 is clearly illustrated. More specifically, as actuator 366 moves, end 428 of finger spring 368 remains in slot 392, and end 426 of finger spring 368 remains in channel 390. A flange 432 is formed by wall 372 and limits lateral movement of finger spring 368.

Figure 13:
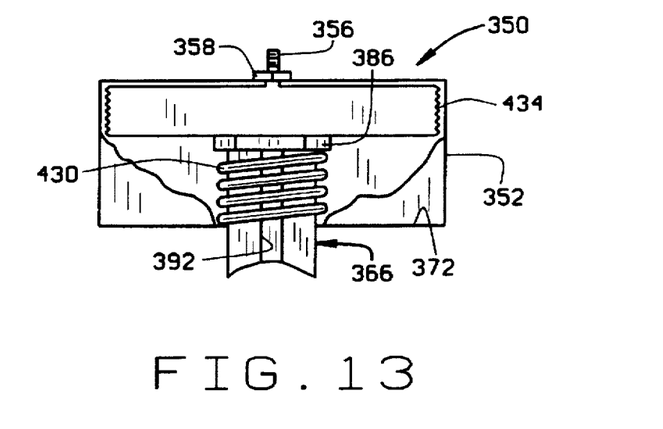
FIG. 13 illustrates bellows, and the actuator arrangement of the air switch, with parts cut-away, shown in FIG. 6.

FIG. 13 illustrates a section of air switch 350 with parts cut-away, including a portion of plate 352 cut-away to illustrate bellows 434. Bellows 434 is in flow communication with port 356 and when a pulse of air is transmitted through port 356 to bellows 434, bellows 434 expands. Spring 430 biases actuator head 386 against bellows 434, and when bellows 434 expands, actuator 366 moves substantially linearly in one direction, i.e., actuator head 386 moves toward wall 372. When an air pulse no longer acts on bellows 434, bellows 434 contracts. Movement of actuator 366 under this condition depends on the position of end 426 of finger spring 368 in channel 390 as described above.

Actuator 366 can be molded using, for example, any suitable thermoplastic material. Suitable snap action switches are commercially available from Micro Switch, a Honeywell Division, 11 W. Spring Street, Freeport, Ill. 61032, and suitable air transmitters, including air bellows, are commercially available from Tridelta Industries, Inc., 7350 Corporate Blvd., Mentor, Ohio 44060-4856.

Switching apparatus 300 and 350 provide the important advantage that the motor centrifugal switch can be eliminated. Therefore, the cost of a motor incorporating the features of the present invention, in terms of both component cost and assembly cost, is believed to be reduced by using switching apparatus 300 or 350.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the inventions are to be limited only by the terms of the appended claims.

What is claimed is:

1. An electric motor, comprising:
   a stator comprising a stator core having start and run windings, said stator core forming a stator bore;
   a rotor comprising a rotor shaft concentrically arranged with respect to said stator core, a rotor core positioned concentrically with said rotor shaft and attached thereto;
   a motor shell having an opening therein, said stator core and said rotor core positioned within said motor shell; and
   an air switch comprising a boss and a housing, said air switch housing positioned within said motor shell, said air switch boss extending from said air switch housing and through said motor shell opening.

2. An electric motor in accordance with claim 1 wherein said air switch boss is threaded, and said motor further comprises a nut threadedly engaged to said boss.

3. An electric motor in accordance with claim 1 further comprising a power cord comprising a plurality of power leads and an insulator, said power leads positioned partially within, and extending from one end of, said insulator, a grommet having an opening through which said insulator extends, said grommet having an groove therein, said motor shell further having a notch at one end thereof, a portion of a wall of said motor shell at a periphery of said notch being located in said grommet groove.

4. An electric motor in accordance with claim 3 further comprising an endshield secured to said motor shell at said one end so that said endshield and said motor shell cooperate to hold said grommet in said notch.

5. An electric motor in accordance with claim 1 wherein said air switch comprises a first blade terminal and a second blade terminal, said first blade terminal electrically connected to a first conductor and said second blade terminal electrically connected to a second conductor, said first conductor coupled to a power line and said second conductor coupled to a common electrical connection between said start and run windings.

6. An electric motor in accordance with claim 5 wherein said air switch further comprises an actuator and a snap action switch, said snap action switch electrically connected in series with said first and second blade terminals.

7. An electric motor in accordance with claim 6 wherein said snap action switch comprises a movable button, said button normally biased to be in a fully extended condition.

8. An electric motor in accordance with claim 7 wherein when said button is fully extended, said snap action switch is in an open, non-conducting state, and when said button is fully depressed, said snap action switch is in a closed, conducting state.

9. An electric motor in accordance with claim 8 wherein said actuator comprises an actuating arm movable from and between first and second positions, when in said first position, said actuating arm does not contact said snap action switch button, and when in said second position, said actuating arm is in contact with, and depresses, said snap action switch button.

10. An electric motor in accordance with claim 9 wherein said actuator is biased so that said actuator arm is normally in said first position.

11. An electric motor in accordance with claim 6 wherein said air switch further comprises an air transmitter in flow communication with said actuator.

12. An electric motor in accordance with claim 1 wherein said air switch comprises a first snap action switch and a second snap action switch, and an actuator movable relative to said first and second snap action switches.

13. An electric motor in accordance with claim 12 wherein said first and second snap action switches each comprises a movable button normally biased to be in a fully extended condition.

14. An electric motor in accordance with claim 13 wherein said first and second snap action switches each comprises a first blade terminal and a second blade terminal, said first blade terminal of said first snap action switch electrically coupled to a first motor power terminal, said second blade terminal of said first snap action switch electrically coupled to a common connection between said run and start windings, said first blade terminal of said second snap action switch electrically coupled to said start winding, and said second blade terminal of said second snap action switch electrically coupled to a second motor power terminal.

15. An electric motor in accordance with claim 13 wherein when said first switch button is fully extended, said first switch is in an open, non-conducting state, and when said first switch button is fully depressed, said first switch is in a closed, conducting state, and wherein when said second switch button is fully extended, said second switch is in an open, non-conducting state, and when said second switch button is fully depressed, said second switch is in a closed, conducting state.

16. An electric motor in accordance with claim 1 wherein said air switch further comprises an actuator positioned in said air switch housing, said actuator comprising a main body portion, an actuating arm extending from said main body portion, and an actuator head.

17. An electric motor in accordance with claim 16 wherein said actuating arm comprises first and second actuating surfaces, said first and second actuating surfaces each comprising a transition, angular portion and a substantially planar portion.

18. An electric motor in accordance with claim 16 wherein said air switch further comprises a finger spring, and said actuator further comprises a channel, one end of said finger spring positioned within said channel, said channel being movable relative to said finger spring, said finger spring limiting movement of said actuator.

19. An electric motor in accordance with claim 18 wherein said channel comprises a motor start leg, a motor run transition leg, a motor run position, a motor off transition leg, a motor off leg, and a motor off position.

* * * * *